United States Patent [19]
Adler

[11] Patent Number: 5,252,381
[45] Date of Patent: Oct. 12, 1993

[54] AIRFOIL WITH THICK TRAILING EDGE

[76] Inventor: Alan J. Adler, 752 La Para Ave., Palo Alto, Calif. 94306

[21] Appl. No.: 900,362

[22] Filed: Jun. 18, 1992

[51] Int. Cl.[5] .......................... B32B 3/00; B64C 1/00
[52] U.S. Cl. ..................................... 428/156; 428/192; 428/212; 244/123; 244/124
[58] Field of Search ............... 428/156, 172, 212, 192, 428/81, 121, 130; 244/123, 124, 34 R, 35 R, 213, 212, 215, 198

[56] References Cited

U.S. PATENT DOCUMENTS

| | | | |
|---|---|---|---|
| 1,710,672 | 4/1929 | Bonney | 224/215 |
| 3,504,873 | 4/1970 | Spence | 224/123 |
| 4,560,358 | 12/1985 | Adler | 446/46 |

FOREIGN PATENT DOCUMENTS 9100757 1/1991 PCT Int'l Appl. .

OTHER PUBLICATIONS

Sighard Hoerner, et al., *Fluid-Dynamic Drag*, 1965, pp. 3–22.
P. A. Henne et al., *A New Airfoil Design Concept*, American Institute of Aeronautics and Astronautics, Inc. 1989.
Abbott and Von Doenhoff, *Theory of Wing Sections*, Dover Publications, 1959, pp. 228 and 229.

*Primary Examiner*—Donald J. Loney
*Attorney, Agent, or Firm*—Townsend and Townsend Khourie and Crew

[57] ABSTRACT

An airfoil section comprising a relatively thick trailing edge and a sloped rear surface.

2 Claims, 1 Drawing Sheet

AIRFOIL WITH THICK TRAILING EDGE

BACKGROUND OF THE INVENTION

The present invention relates to fluid dynamic airfoils and the like. It was first conceived for application in models or toys but is not limited to toy applications. The present inventor first sought an airfoil, for use in toys, which could be constructed from a soft and flexible material yet still maintain good aerodynamic shape and performance.

Conventional airfoil sections have relatively thin trailing edges. In practice, these trailing edges are often thinner than 1% of the chord dimension of the airfoil. However these thin edges are often accompanied by structural problems—specifically low strength and low stiffness.

It is a common practice to slightly truncate the trailing edge of airfoils in order to achieve finite trailing edge thickness and a somewhat more practical structure. However it is well known that increased drag will result if the trailing edge thickness exceeds 1% of the total chord length of the airfoil. So airfoils are rarely truncated to more than 1% thickness.

SUMMARY OF THE INVENTION

The present invention provides an airfoil which combines good structural strength and stiffness and good fluid dynamic lift with acceptably low drag. In brief, the present inventor has discovered that much thicker trailing edges will operate satisfactorily when configured with a sloped rear surface.

A further understanding of the nature and advantages of the present invention can be realized by reference to the remaining portions of the specification and the drawings.

DESCRIPTION OF THE SPECIFIC EMBODIMENTS

Figure 1:
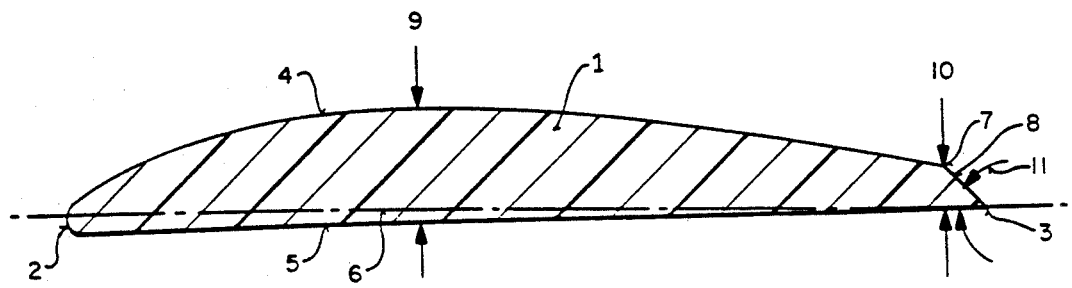
FIG. 1 is a diagram of an embodiment of the airfoil section having a relatively flat lower surface.

FIG. 1 an airfoil 1 having a cross-section comprising: leading and trailing edges 2, and 3 respectively and a chord line 6 passing through the leading and trailing edges, non-divergent upper and lower surfaces 4 and 5 respectively and a sloped rear surface 8 joining the upper and lower surfaces, a maximum thickness 9 between the upper and lower surfaces, a point of intersection 7 between the upper surface and the rear surface, a rear thickness 10 measured from the point of intersection 7 to the lower surface 5, the rear thickness 10 having a dimension of between 25% and 100% of the maximum thickness 9, the rear surface 8 sloped such that the angle 11 between the rear surface and the chord line 6 is between 30 and 75 degrees. As can be seen in FIG. 1, the point of intersection defines an abrupt change in slope between upper surface 4 and rear surface 8.

Note that an important feature of the present invention is that upper surface 4 and lower surface 5 are non-divergent. That is, the surfaces never diverge as one moves either forward or aft of the point of maximum thickness 9.

Figure 2:
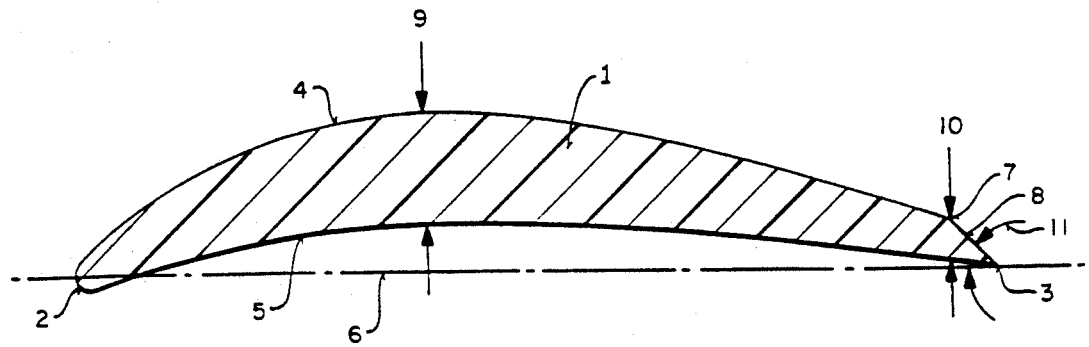
FIG. 2 is a diagram of an embodiment of the airfoil section having a concave lower surface.

FIG. 2 illustrates an alternative embodiment of the invention having greater camber. This alternative can produce higher lift, however it has higher drag than the flat-bottomed section when operating at low lift. Thus the alternative of FIG. 2 would be selected in cases where high lift is a primary design criterion.

The present inventor has discovered that airfoils having sections of the above configuration exhibit good lift/drag ratio combined yet have much greater structural strength and stiffness than conventional airfoils which have thin trailing edges.

Small airfoils of the present invention constructed of soft flexible foam material have performed well in toys. In addition, it is believed that airfoils of this configuration have important structural and functional advantages in non-toy applications. Such application include, but are not limited to, wings, turbine blades, fans, propellers, and helicopter rotors.

While in foregoing specification describes the present invention in detail in order to make a full disclosure, it will be understood that variations or modifications are possible without departing from the spirit and scope of the invention as described in this specification and the following claims.

What is claimed is:

1. An airfoil with a cross-section comprising:
   leading and trailing edges;
   a chord line passing through said leading and trailing edges:
   a non-divergent upper and lower surfaces;
   a maximum thickness between said upper and lower surfaces;
   a sloped rear surface joining said upper and lower surfaces;
   a point of intersection between said upper surface and said rear surface, said point of intersection defining an abrupt change in slope between said upper surface and said rear surface;
   a rear thickness measured from said point of intersection to said lower surface;
   said rear thickness having a dimension of between 25% and 100% of said maximum thickness; and
   said rear surface sloped such that the angle between said rear surface and said chord line is between 30 and 75 degrees.

2. The airfoil of claim 1, constructed of flexible material.

* * * * *